(12) United States Patent
Yoshida et al.

(10) Patent No.: US 7,534,542 B2
(45) Date of Patent: May 19, 2009

(54) BINDER RESIN FOR TONER, METHOD FOR PRODUCING THE SAME, AND TONER FOR ELECTROPHOTOGRAPHY USING THE RESIN

(75) Inventors: Takeshi Yoshida, Sodegaura (JP); Kazuya Sakata, Sodegaura (JP)

(73) Assignee: Mitsui Chemicals, Inc., Tokyo (JP)

( * ) Notice: Subject to any disclaimer, the term of this patent is extended or adjusted under 35 U.S.C. 154(b) by 491 days.

(21) Appl. No.: 10/572,647

(22) PCT Filed: Sep. 24, 2004

(86) PCT No.: PCT/JP2004/013893

§ 371 (c)(1), (2), (4) Date: Mar. 20, 2006

(87) PCT Pub. No.: WO2005/028545

PCT Pub. Date: Mar. 31, 2005

(65) Prior Publication Data

US 2007/0122731 A1 May 31, 2007

(30) Foreign Application Priority Data

Sep. 24, 2003 (JP) ............................ 2003-332582

(51) Int. Cl.
*G03G 5/00* (2006.01)
(52) U.S. Cl. ............................ 430/137.15; 430/137.19; 430/109.2; 430/109.3; 526/273; 525/191; 525/208
(58) Field of Classification Search .............. 430/109.2, 430/109.3, 137.15, 137.19; 526/273; 525/191, 525/208
See application file for complete search history.

(56) References Cited

U.S. PATENT DOCUMENTS 6,497,983 B2   12/2002   Iwa et al.
2002/0076637 A1   6/2002   Iwa et al.

FOREIGN PATENT DOCUMENTS

| EP | 1 197 805 A2 | 4/2002 |
| EP | 1 197 805 A3 | 4/2002 |
| JP | 2000-143721 A | 5/2000 |
| JP | 2000-302839 A | 10/2000 |
| JP | 2002-31917 A | 1/2002 |
| JP | 2002-148864 A | 5/2002 |
| JP | 2003-15364 A | 1/2003 |
| JP | 2003-270851 A | 9/2003 |
| JP | 2004-53622 A | 2/2004 |
| KR | 2002-0029311 A | 4/2002 |

*Primary Examiner*—Mark A Chapman
(74) *Attorney, Agent, or Firm*—Buchanan Ingersoll & Rooney PC

(57) ABSTRACT

Disclosed is a binder resin for a toner which contains a styrene-acrylic resin having a gel component and a small amount of a volatile component. Also disclosed are a method for producing the binder resin and a toner employing the binder resin.

A binder resin (A) for a toner contains a styrene-acrylic resin having a structure derived from a carboxyl group and a structure derived from a glycidyl group, wherein the content ($A_{IS}$) of a gel component is 1 mass % $\leq A_{IS} \leq$ 50 mass % and the content ($A_{VO}$) of a volatile component in the resin is $A_{VO} \leq$ 200 ppm.

4 Claims, No Drawings

BINDER RESIN FOR TONER, METHOD FOR PRODUCING THE SAME, AND TONER FOR ELECTROPHOTOGRAPHY USING THE RESIN

TECHNICAL FIELD

The present invention relates to a binder resin for a toner and a method for producing the same. Furthermore, the invention relates to a toner for electrophotography using the aforementioned resin.

BACKGROUND ART

With recent demands of copying at high speeds and fixing at low energies and the like, toners with fixing properties at a temperature as low as possible have been in demand. In response to the demand, there has been proposed a method for enhancing fluidity of a binder resin for a toner by increasing the ratio of the low molecular weight portion. However, this method has a problem of causing the deterioration in offset resistance. Therefore, there has been reported a method for balancing the fixing properties and offset resistance by introducing a gel component into a binder resin for a toner.

A toner used for copiers or printers gives off an odor in printing through the melting process, if a volatile solvent used in the production of toners, an unreacted raw material or the like remains in the toner. In recent years, information appliances have been rapidly come into use and a plurality of printers have been installed in offices. Therefore, development of a toner with a small amount of the remaining volatile component has been demanded from the market. Until now, as a method for removing a volatile component remained in a resin which does not contain a gel component, JP2000-143721A (Patent Document 1) has been proposed.

However, in case a volatile component is removed from the resin containing a gel component using this method, there is a possibility that toners might not be stably produced due to the Weissnberg effect. Namely, a toner containing a gel component and having a small amount of a volatile component has not been discovered yet.

[Patent Document 1] JP2000-143721A

DISCLOSURE OF THE INVENTION

Accordingly, the present invention provides a binder resin for a toner which contains a styrene-acrylic resin having a gel component and a small amount of a volatile component, and a method for producing the same. Furthermore, the invention provides a toner using the binder resin for a toner.

The present inventors have conducted an extensive study and completed the present invention. Thus, the present invention is:

(1) a binder resin (A) for a toner which comprises a styrene-acrylic resin having a structure derived from a carboxyl group and a structure derived from a glycidyl group, wherein the content ($A_{IS}$) of a gel component is 1 mass % $\leq A_{IS} \leq$ 50 mass % and the content ($A_{VO}$) of a volatile component in the resin is $A_{VO} \leq$ 200 ppm;

(2) a toner for electrophotography comprising the binder resin (A) for a toner as described in (1); and (3) a method for producing the binder resin (A) for a toner as described in (1) comprising the following processes (I), (II) and (III) in this order:

Process (I): a process comprising melt-mixing a carboxyl group-containing vinyl resin (B) and an epoxy group-containing vinyl resin (C) at a temperature ($T_R$) satisfying 120° C. $\leq T_R \leq$ 230° C. in a twin screw extruder for the reaction;

Process (II): a process comprising introducing water into the twin screw extruder, and mixing water with the resin composition obtained in the process (I) under the conditions satisfying a pressure ($P_{EX}$) of 1 MPa $\leq P_{EX} \leq$ 2.7 MPa and a temperature ($T_M$) of 120° C. $\leq T_M \leq$ 230° C.; and Process (III): a process comprising reducing the pressure inside the twin screw extruder for removing water and the volatile component.

EFFECT OF THE INVENTION

According to the present invention, it is possible to obtain a binder resin for a toner having a small amount of a volatile component even if the resin contains a gel component. Thus, a toner using the binder resin for a toner of the present invention is capable of reducing an unpleasant odor or the like during use.

BEST MODE FOR CARRYING OUT THE INVENTION

The binder resin (A) for a toner of the present invention is a styrene-acrylic resin having a structure derived from a carboxyl group and a structure derived from a glycidyl group. Furthermore, the content ($A_{IS}$) of the gel component is 0.1 mass % $\leq A_{IS} \leq$ 50 mass %, preferably 1 mass % $\leq A_{IS} \leq$ 20 mass %, and more preferably 1 mass % $\leq A_{IS} \leq$ 16 mass %. By having the content of the gel component within the above range, both good offset resistance and fixing properties can be exhibited. In the present invention, a gel component refers to a component that is not dissolved in ethyl acetate, in a resin.

The content ($A_{VO}$) of the volatile component of the binder resin (A) for a toner according to the present invention is $A_{VO} \leq$ 200 ppm and more preferably $A_{VO} \leq$ 100 ppm. By having $A_{VO}$ within the above range, a toner obtained by using the binder resin (A) for a toner does not cause any odor in printing.

The binder resin (A) for a toner according to the present invention is not particularly restricted as far as it exhibits sufficient performance as a toner to be described later. However, it is preferably produced by the reaction of a carboxyl group-containing vinyl resin (B) and an epoxy group-containing vinyl resin (C).

A method for producing the carboxyl group-containing vinyl resin (B) is not particularly restricted, but it is preferably obtained by copolymerizing a vinyl monomer and a vinyl monomer having a carboxyl group. Examples of the vinyl monomers include styrene based compounds such as styrene, p-methylstyrene, α-methylstyrene, vinyl toluene and the like; acrylic esters such as methyl acrylate, ethyl acrylate, propyl acrylate, butyl acrylate, octyl acrylate, cyclohexyl acrylate, stearyl acrylate, benzyl acrylate, furfuryl acrylate, hydroxyethyl acrylate, hydroxybutyl acrylate, dimethylaminomethyl acrylate, dimethylaminoethyl acrylate and the like; methacrylic esters such as methyl methacrylate, ethyl methacrylate, propyl methacrylate, butyl methacrylate, octyl methacrylate, cyclohexyl methacrylate, stearyl methacrylate, benzyl methacrylate, furfuryl methacrylate, hydroxyethyl methacrylate, hydroxybutyl methacrylate, dimethylaminomethyl methacrylate, dimethylaminoethyl methacrylate and the like; diesters of an unsaturated dibasic acid such as dimethyl fumarate, dibutyl fumarate, dioctyl fumarate, dimethyl maleate, dibutyl maleate, dioctyl maleate and the like; acrylonitrile; methacrylonitrile; and amides such as acrylamide, methacrylamide, N-substituted acrylamide, N-substituted methacrylamide and the like. Among these, particularly preferable examples of the vinyl monomers include styrene based compounds, acrylic esters, methacrylic esters, dialkyl fumarate esters, acrylonitrile, acrylamide, methacrylamide and the like.

Examples of the vinyl monomers having a carboxyl group preferably include acrylic acid, methacrylic acid, maleic anhydride, maleic acid, fumaric acid, cinnamic acid, and mono esters of an unsaturated dibasic acid such as methyl fumarate, propyl fumarate, butyl fumarate, octyl fumarate, methyl maleate, ethyl maleate, propyl maleate, butyl maleate, octyl maleate and the like. Particularly preferable are acrylic acid, methacrylic acid, fumaric acid, methyl fumarate, ethyl fumarate, propyl fumarate, butyl fumarate and octyl fumarate.

A method for producing an epoxy group-containing vinyl resin (C) is not particularly restricted, but it is preferably obtained by copolymerizing the aforementioned vinyl monomer and a vinyl monomer having an epoxy group. Examples of the vinyl monomers having an epoxy group include glycidyl acrylate, β-methylglycidyl acrylate, glycidyl methacrylate, β-methylglycidyl methacrylate and the like. Among these, preferable are glycidyl methacrylate and β-methylglycidyl methacrylate.

The glass transition temperature ($Tg_B$) of the carboxyl group-containing vinyl resin (B) is preferably 40° C.$\leq Tg_B \leq$70° C., and more preferably 50° C.$\leq Tg_B \leq$60° C. The glass transition temperature in the present invention is measured in accordance with JIS K-7121. The glass transition temperature within the above range is preferable because both the offset resistance and fixing properties can be exhibited.

An acid value of the carboxyl group-containing vinyl resin (B) is preferably from 1 KOHmg/g to 30 KOHmg/g and more preferably from 5 KOHmg/g to 30 KOHmg/g. The acid value within the above value is preferable because the reaction with the epoxy group-containing vinyl resin (C) properly proceeds so that both good offset resistance and fixing properties can be exhibited. The acid value in the present invention refers to mg of potassium hydroxide necessary to neutralize 1 g of the resin, and it is a value measured in accordance with JIS K-5601-2-1.

The weight-average molecular weight ($C_{Mw}$) of the epoxy group-containing vinyl resin (C) is preferably 10,000$\leq C_{Mw} \leq$100,000, more preferably 15,000$\leq C_{Mw} \leq$85,000, and particularly preferably 25,000$\leq C_{Mw} \leq$75,000. The weight-average molecular weight ($C_{Mw}$) within the above range is preferable because polymerization and gelation properly takes place by the reaction with the carboxyl group-containing vinyl resin (B) so that the mechanical strength and the viscosity are balanced and both excellent durability and fixing properties can be exhibited.

The epoxy equivalent ($C_{EP}$) of the epoxy group-containing vinyl resin (C) is preferably 1,000 g/Eq$\leq C_{EP} \leq$20,000 g/Eq, more preferably 1,000 g/Eq$\leq C_{EP} \leq$15,000 g/Eq, and particularly preferably 1,000 g/Eq$\leq C_{EP} \leq$10,000 g/Eq. The epoxy equivalent ($C_{EP}$) within the above range is preferable because the reaction with the carboxyl group-containing vinyl resin (B) properly takes place so that good offset resistance and fixing properties can be exhibited. The epoxy equivalent in the present invention refers to the mass (g) of an epoxy resin per 1 g equivalent of an epoxy group. The epoxy equivalent can be obtained by a known method, for example, the HCl-dioxane method as described in pp. 161 to 164 of [Epoxy Resin] written by Hiroshi Kakiuchi (Shokodo Co., Ltd.).

The binder resin (A) for a toner of the present invention may include an epoxy resin, a polyester resin, a xylene resin, polyolefin and the like.

The binder resin (A) for a toner according to the present invention can be preferably produced by the following process.

Process (I): A process comprising melt-mixing a carboxyl group-containing vinyl resin (B) and an epoxy group-containing vinyl resin (C) at a temperature ($T_R$) satisfying 120° C.$\leq T_R \leq$230° C. in a twin screw extruder for the reaction.

Process (II): A process comprising introducing water into the twin screw extruder, and mixing water with the resin composition obtained in the Process (I) under the conditions satisfying a pressure ($P_{EX}$) of 1 MPa$\leq P_{EX} \leq$2.7 MPa and a temperature ($T_M$) of 120° C.$\leq T_M \leq$230° C.

Process (III): A process comprising reducing the pressure inside the twin screw extruder for removing water and the volatile component.

In the present invention, the Processes (I), (II) and (III) are carried out in a twin screw extruder. The twin screw extruder is capable of fully mixing a resin and water with ease and removing the volatile potion in a continuous process. Furthermore, the carboxyl group-containing vinyl resin (B) and the epoxy group-containing vinyl resin (C) are homogeneously melt-mixed so that the reaction can homogeneously proceed. In the twin screw extruder a clearance between an outer diameter of a screw and a cylinder is from 1 mm to 5 mm, preferably from 1.5 mm to 4 mm, and more preferably from 2 mm to 3 mm. When the clearance between an outer diameter of a screw and a cylinder is less than 1 mm, the melt-mixed resin remains in the twin screw extruder, causing vent-up in some cases. When it is greater than 5 mm, the resin can not fill the twin screw extruder and, consequently can not be melt-mixed sufficiently and therefore the resin will not be mixed with water properly. So, the volatile component can not be removed, and the reaction proceeds heterogeneously in some cases.

In the Process (I), the temperature ($T_R$) is 120° C.$\leq T_R \leq$230° C. and preferably 140° C.$\leq T_R \leq$220° C. when the carboxyl group-containing vinyl resin (B) and the epoxy group-containing vinyl resin (C) are melt-mixed for the reaction. When $T_R$ is within this range, the reaction of the carboxyl group with the epoxy group can fully take place and further, decomposition, depolymerization of the resin or the like can be prevented.

It is preferable that the carboxyl group-containing vinyl resin (B) is previously mixed with the epoxy group-containing vinyl resin (C) in a Henschel mixer or the like and then the mixture is fed into the twin screw extruder.

In the Process (II), the pressure ($P_w$) of water which is introduced into the twin screw extruder is 1 MPa$\leq P_w \leq$3 MPa, and preferably 2.1 MPa$\leq P_w \leq$2.5 MPa. When $P_w$ is within this range, water is sufficiently injected into the resin and the melt-mixed resin can be sufficiently mixed with water, so that the volatile component is effectively removed. In the present invention, the pressure refers to a gauge pressure, that is, a value calculated by subtracting an atmospheric pressure from an absolute pressure based on a vacuum unless otherwise defined.

The pressure ($P_{EX}$) inside the twin screw extruder is preferably 1 MPa$\leq P_{EX} \leq$2.7 MPa and more preferably 2 MPa$\leq P_{EX} \leq$2.5 MPa. When the pressure in the twin screw extruder ($P_{EX}$) is within the above range, the volatile component can be sufficiently removed.

In the Process (II), the temperature ($T_M$) when mixing the resin composition produced in the Process (I) with water is 120° C.$\leq T_M \leq$230° C. and preferably 140° C.$\leq T_M \leq$220° C. When $T_M$ is within this range, a resin having an appropriate viscosity can be fully mixed with water and decomposition of the resin can be prevented.

The amount of water used in the present invention is preferably from 0.5 mass part to 2 mass parts and more preferably from 1 mass part to 1.5 mass parts based on 100 mass parts of the resin (B). When the amount of water is less than 0.5 mass part, the volatile component cannot be fully removed in some cases. When the amount exceeds 2 mass parts, an effect of removing the volatile component may not be enhanced in some cases.

In the present invention, water may be introduced once or more than once. Introduction of water can be preferably carried out from 1 step to 3 steps and more preferably from 1 step to 2 steps.

The contact time of the resin (A) with water in the present invention is preferably from 0.1 second to 5 seconds and more preferably from 1 second to 3 seconds. When the time is less than 0.1 second, an effect of removing the volatile component may be insufficient in some cases. When the time is more than 5 seconds, the resin is decomposed so that the effect of removing the volatile component is not enhanced in some cases. In the present invention, the contact time of the resin (A) with water is obtained as described below. At a state that the screw is placed in the twin screw extruder, the spatial volume is defined as V ($m^3$), a flow rate of the resin as Q (kg/hr), and a density of the resin as d ($g/cm^3$). Then, the residence time TO is obtained from TO=V/Q/d. Furthermore, by dividing TO by the barrel number of the twin screw extruder, the contact time T1 is obtained.

In the Process (III), by reducing the pressure inside the twin screw extruder, water and the volatile component are discharged from the binder resin (A) for a toner. The pressure is preferably from 0.001 MPa to 0.05 MPa and more preferably from 0.005 MPa to 0.05 MPa as an absolute pressure. When the pressure is reduced to less than 0.001 MPa, a pressure reducing device may be expensive, so that the device makes the cost increase in some cases. On the other hand, when the pressure exceeds 0.05 MPa, an effect of removing the volatile component is insufficient in some cases. The time required for maintaining the pressure reduced state is usually from 0.1 second to 1 second.

In the method described above, the Processes (I), (II), and (III) can be carried out using a twin screw extruder and using a plurality of extruders.

In the present invention, the volatile component refers to that of a volatile organic compound. This substance is composed of a solvent used in the production of resins, unreacted monomer, decomposed substance of resins and the like. Specifically, an aromatic compound or an acrylic compound is exemplified. In the present invention, water is not included in the volatile component. Water is odorless and harmless, and considered to be less related to the object of the present invention.

The toner of the present invention can be obtained according to a known method by combining a colorant, a charge controlling agent, a mold release agent, a pigment dispersant and the like with the binder resin (A) for a toner as required. The toner according to the present invention has excellent property such that an odor can be remarkably reduced when it is used in printing, while maintaining excellent performance as a conventional toner, since the volatile component in the binder resin (A) for a toner is removed according to the above method.

EXAMPLES

The present invention is now more specifically illustrated below with reference to Examples. However, the present invention is not restricted to these Examples. Hereinafter, % indicates mass % and part(s) indicates mass part(s).

A device, conditions and methods of the measurement are as follows.

[Quantitative Method of the Content of the Volatile Component (Internal Standard Method)]

0.01 g of 1,2-dichlorobenzene was weighed precisely and diluted in 70 ml of acetone for mixing them well to produce an internal standard solution. The concentration of 1,2-dichlorobenzene in the internal standard solution was defined as z.

1 g of a resin to measure, 1 g of the internal standard solution and 20 g of acetone were precisely weighed respectively and mixed to dissolve the resin. The resin was defined as $x_0$ gram, the internal standard solution as $y_0$ gram. After the dissolution, the solution was allowed to stand to separate the precipitation and the supernatant liquid. 3 μl of the supernatant liquid was analyzed using gas chromatography under the following conditions.

Device: GL Sciences Inc.
GC-353 column: 50 m×0.25 mm
ULBON HR-1
Column temperature: 60° C.
Injection temperature: 180° C.
$N_2$ gas flow rate: 10 ml/min.
Sample solution: 5% acetone solution
Amount of solution introduced: 3 μl
Detector: FID A volatile component contained in the resin was identified by the obtained gas chromatogram. Subsequently, the volatile components were weighed. Herein, styrene was described as an example and other components were done in the same manner.

Firstly, a calibration curve of the above identified component was prepared.

Preparation of Calibration Curves 1. 0.2 g of 1,2-dichlorobenzene and 0.1 g of styrene were weighed precisely in a 20-mL screw tube and diluted with 10 g of acetone, and then mixed well.

2. 0.2 g of 1,2-dichlorobenzene and 0.2 g of styrene were weighed precisely in a 20-mL screw tube for diluting with 10 g of acetone, and then mixed well.

3. 0.2 g of 1,2-dichlorobenzene and 0.3 g of styrene were weighed precisely in a 20-mL screw tube and diluted with 10 g of acetone, and then mixed well.

4. 1 μl of each sample adjusted by the above processes 1 to 3 was dispensed in a 20-mL screw tube using a micro syringe and diluted with 10 g of acetone, and then mixed well.

5. Samples obtained in the process 4 were respectively injected into gas chromatograph under the above conditions.

6. An AREA value was obtained according to the concentration of each sample by the gas chromatograph.

7. With respect to the AREA value ratio ($x_1$) of styrene/1,2-dichlorobenzene, the mass ratio (=$y_1$) of styrene/1,2-dichlorobenzene was plotted and a first-order approximate expression (Y=ax+b) was calculated using the least square method to prepare a calibration curve.

The correlation coefficient $R^2$ was confirmed to be not less than 0.9800. When it is less than 0.9800, a calibration curve was prepared again.

Calculation of the Amount of Styrene in a Sample

1. The ratio of the AREA value of styrene to the AREA value of 1,2-dichlorobenzene in the sample obtained by the gas chromatograph was defined as $x_2$.

2. By substituting $x_2$ into the first-order approximate expression of the calibration curve, the mass ratio (=$y_2$) of styrene/1,2-dichlorobenzene was calculated.

3. The amount of styrene in the resin was calculated by the following equation.

Styrene amount (ppm)=$y_2 \times z \times y_0/(1,000,000 \times x_0)$

[Method for Measuring the Acid Value]

The acid value was obtained by the neutralization titration. 5 g of the sample was dissolved in 50 ml of a mixed solvent of xylene/dimethylformamide=1:1 (masst ratio) and several droplets of a solution of phenolphthalein and ethanol were added thereto as an indicator, and then, titrated with a 1/10 normal KOH aqueous solution. The titration was completed at a point where the color of the sample solution was painted from colorless to purple. The acid value (KOHmg/g) was calculated from the amount of the titration and the mass of the sample.

[Method for Measuring the Epoxy Equivalent]

The epoxy equivalent was obtained by the known HCl-dioxane method. More specifically, it was measured in accordance with the method as described in pp. 161 to 164 of [Epoxy Resin] written by Hiroshi Kakiuchi (Shokodo Co., Ltd.).

[Measurement of the Content of the Gel Component]

About 2.5 g of a resin and about 47.5 g of ethyl acetate were stirred at 25±3° C. for 12 hours for fully dissolving a soluble portion to prepare a solution. The concentration of this solution was described as (RC). Subsequently, the obtained solution was allowed to stand for 16 hours. After the insoluble portion and the supernatant liquid were separated, the concentration of the supernatant liquid (SC) was analyzed. 5 g of the supernatant liquid was taken and dried at 150° C. for 1 hour to remove ethyl acetate. Then, the mass of remaining resin was measured and the concentration of the supernatant liquid (SC) was calculated therefrom.

From the values of RC and SC, the content of the gel component was obtained by the following equation.

The content of the gel component=$[(RC-SC)/RC] \times 100(\%)$ (Production of the Binder Resin for Toner)

Example 1

93 parts of a carboxyl group-containing vinyl resin (acid value: 9.8) was mixed with 7 parts of an epoxy group-containing vinyl resin (epoxy equivalent: 5,550) using a Henschel mixer or the like. While reacting the resulting mixture at 200° C. of the resin temperature at the discharge portion of the twin screw extruder using a twin screw extruder (KEXNS-40, manufactured by Kurimoto, Ltd., a clearance between an outer diameter of a screw and a cylinder: 3 mm), water was injected thereinto once at 2.0 MPa. The contact time of the resin with water was 1.5 seconds. Furthermore, a pressure reducing pump was equipped at a pressure reducing port installed at an outlet side from the above water inlet and the volatile component was removed by reducing the pressure down to 0.095 MPa based on an absolute pressure. After 90 seconds of the residence time, the resin taken out from the discharge portion was cooled and solidified using a chill roll and ground using a grinder to obtain a binder resin for a toner (resin A-1). The amount of the volatile component remained in the resin was measured, and as a result, the total amount of the volatile components was 155 ppm, of which the amount of styrene was 40 ppm and that of xylene was 90 ppm. The content of the gel component was 8%.

Example 2

A binder resin for a toner (resin A-2) was obtained in the same manner as in Example 1, except that the resin temperature at the discharge portion of the twin screw extruder was changed to 220° C. The total amount of the volatile components was 175 ppm, of which the amount of styrene was 70 ppm and that of xylene was 90 ppm. Furthermore, the content of the gel component was 14%.

Comparative Example 1

A resin for a toner (A-3) was obtained in the same manner as in Example 1, except that water was not injected (the water inlet was sealed) and a pressure reducing pump was not connected (the pressure reducing inlet was sealed). The total amount of the volatile components was 650 ppm. At that time, the amount of styrene was 280 ppm and that of xylene was 300 ppm. Furthermore, the content of the gel component was 8%.

Comparative Example 2

A resin for a toner (resin A-4) was obtained in the same manner as in Example 1, except that the resin temperature at the discharge portion of the twin screw extruder was changed to 220° C. The total amount of the volatile components was 670 ppm, of which the amount of styrene was 320 ppm and that of xylene was 270 ppm. Furthermore, the content of the gel component was 15%.

Comparative Example 3

93 parts of a carboxyl group-containing vinyl resin was mixed with 7 parts of an epoxy group-containing vinyl resin using a Henschel mixer or the like. The resulting mixture was dissolved in xylene in a reactor with a stirrer and an outlet (the outlet was sealed). Then, while the solvent was removed under a temperature condition of 200° C., the reaction and drying were carried out. However, due to the Weissenberg effect, even though the outlet was opened, the resin could not be discharged from the reactor.

The results thereof are summarized in Table 1.

TABLE 1

| Resin A | Example 1 A-1 | Example 2 A-2 | Comparative Example 1 A-3 | Comparative Example 2 A-4 | Comparative Example 3 A-5 |
|---|---|---|---|---|---|
| Carboxyl group-containing vinyl resin (B) Acid value (mgKOH/g) | 7.3 | 7.3 | 7.3 | 7.3 | 7.3 |
| Carboxyl group-containing vinyl resin (B) $Tg_B$ (° C.) | 58 | 58 | 58 | 58 | 58 |
| Epoxy group-containing vinyl resin (C) Epoxy equivalent $C_{EP}$ (Eq/g) | 5,550 | 5,550 | 5,550 | 5,550 | 5,550 |

TABLE 1-continued

| Resin A | Example 1 A-1 | Example 2 A-2 | Comparative Example 1 A-3 | Comparative Example 2 A-4 | Comparative Example 3 A-5 |
|---|---|---|---|---|---|
| Epoxy group-containing vinyl resin (C) Weight-average molecular weight $C_{Mw}$ | 30,000 | 30,000 | 30,000 | 30,000 | 30,000 |
| Mass ratio (B/C) | 93/7 | 93/7 | 93/7 | 93/7 | 93/7 |
| Twin screw extruder used or not | Yes | Yes | Yes | Yes | No |
| Resin temperature of the twin screw extruder | 200 | 220 | 200 | 220 | 220 |
| Clearance between an outer diameter of a screw of the twin screw extruder and a cylinder (mm) | 3 | 3 | 3 | 3 | N/A |
| Water introduction pressure (MPa) | 2.0 | 2.0 | N/A | N/A | N/A |
| Steps of water introduction (No.) | 1 | 1 | N/A | N/A | N/A |
| Pressure under a reduced pressure (MPa) | 0.095 | 0.095 | N/A | N/A | N/A |
| Contact time of water with the resin (second) | 1.5 | 1.5 | 1.5 | 1.5 | 1.5 |
| Residence time of the twin screw extruder (second) | 90 | 90 | 90 | 90 | N/A |
| Content of gel component ($A_{IS}$) (mass %) | 8 | 14 | 8 | 15 | Note |
| Total amount of volatile components (ppm) | 155 | 175 | 650 | 670 | Note |
| Content of styrene (ppm) | 40 | 70 | 280 | 320 | Note |
| Content of xylene (ppm) | 100 | 90 | 300 | 270 | Note |

Note:
Unable to measure since the resin could not be discharged.

As described above, according to the present invention, it was possible to obtain a binder resin for a toner which contains a gel component and a small amount of a volatile component.

(Production of a Toner and Performance Evaluation)

Example 3

100 parts of the resin A-1, 6 parts of a carbon black, 2.5 parts of a wax (polyolefin based wax: Hi Wax NP105, a product of Mitsui Chemicals, Inc.) and 1.0 part of a charge controlling agent (BONTRON S34, a product of Orient Chemical Industries, Ltd.) were mixed using a Henschel mixer; the resulting material was kneaded using a twin screw extruder (PCM-30, a product of Ikegai Corporation) at 150° C. of the resin temperature at the discharge portion of the twin screw extruder for 30 seconds of the residence time. Then, the kneaded material was cooled, ground and classified to obtain a non-magnetic toner of about 8 micron. To 100 parts of the toner power, 0.5 part of a hydrophobic silica (Aerosil R-972, a product of Nippon Aerosil Co., Ltd.) was added and mixed. 3 parts of the toner and 97 parts of a carrier were mixed to obtain a non-magnetic 2-component developer. By remodeling a commercial high-speed copier, an image was drawn to evaluate.

The toner was evaluated in the following manner.

(Fixing Properties)

Copy was performed at a rate of 72 sheets/min alternating the temperature of the fixing roll A sand eraser ("MONO", a plastic sand eraser, manufactured by Tombow Pencil Co., Ltd.) weighted with a force of 0.1 MPa was rubbed back and forth twice between a solid black portion and a white background of the obtained copy. Blackness of the solid black portion was measured by using an ink densitometer. The lowest temperature at which the ratio of a concentration after treatment with the sand eraser to that before the treatment became not less than 60% was shown.

(Offset Resistance)

When copying at different temperatures, the temperature for causing offset phenomenon was shown.

(Odor)

To 100 parts of the toner powder, 0.5 part of a hydrophobic silica (Aerosil R-972, a product of Nippon Aerosil Co., Ltd.) was added and mixed. 3 parts of the toner and 97 parts of a carrier were mixed, to obtain a non-magnetic 2-component developer. By remodeling a commercial high-speed copier, an image was drawn. At that time, an odor from the paper was compared by smelling.
O: weak odor
X: strong odor Example 4

A non-magnetic 2-component developer was obtained and evaluated in the same manner as in Example 3, except that the resin A-2 was used instead of the resin A-1.

Comparative Example 4

A non-magnetic 2-component developer was obtained and evaluated in the same manner as in Example 3, except that the resin A-3 was used instead of the resin A-1.

Comparative Example 5

A non-magnetic 2-component developer was obtained and evaluated in the same manner as in Example 3, except that the resin A-4 was used instead of the resin A-1.

The evaluation results of these toners were summarized in Table 2.

TABLE 2

| Resin A | Example 3 A-1 | Example 4 A-2 | Comparative Example 4 A-3 | Comparative Example 5 A-4 |
|---|---|---|---|---|
| The lowest fixing temperature at which the ratio became not less than 60%(° C.) | 155 | 160 | 155 | 160 |

TABLE 2-continued

|  | Example 3 | Example 4 | Comparative Example 4 | Comparative Example 5 |
|---|---|---|---|---|
| Resin A | A-1 | A-2 | A-3 | A-4 |
| Temperature occurring offset phenomenon (° C.) | 220 | 230 | 220 | 230 |
| Odor | ○ | ○ | x | x |

The invention claimed is:

1. A method for producing the binder resin (A) for a toner comprising the following processes (I), (II) and (III) in this order:

Process (I): A process comprising melt-mixing a carboxyl group-containing vinyl resin (B) obtained by copolymerizing a vinyl monomer selected from styrene based compounds, acrylic esters, methacrylic esters, diesters of an unsaturated dibasic acid, acrylonitrile, methacrylonitrile, acrylamide, methacrylamide, N-substituted acrylamide, and N-substituted methacrylamide, and a vinyl monomer having a carboxyl group selected from acrylic acid methacrylic acid maleic anhydride, maleic acid, fumaric acid, cinnamic acid, and mono esters of an unsaturated dibasic acid and an epoxy group-containing vinyl resin (C) obtained by copolymerizing a vinyl monomer selected from styrene based comnounds, acrylic esters, methacryilc esters, diesters of an unsaturated dibasic acid, acrylonitrile, methacrylonitrile, acrylamide, methacrylamide, N-substituted acrylamide, and N-substituted methacrylamide, and a vinyl monomer having an epoxy group selected from glycidyl acrylate, β-methylglycidyl acrylate, glycidyl methacrylate, and β-methylglycidyl methacrylate at a temperature ($T_R$) satisfying 120° C.$\leq T_R \leq$230° C. in a twin screw extruder for the reaction;

Process (II): A process comprising introducing water into the twin screw extruder, and mixing water with the resin composition obtained in the Process (I) for 0.1 second to 5 under the conditions satisfying a pressure ($P_{EX}$) of 1 MPa$\leq P_{EX} \leq$2.7 MPa and a temperature ($T_M$) of 120° C.$\leq T_M \leq$230° C.; and Process (III): A process comprising reducing the pressure inside the twin screw extruder for removing water and the volatile component.

2. The method for producing the binder resin (A) for a toner according to claim 1, wherein the carboxyl group-containing vinyl resin (B) has a glass transition temperature ($Tg_B$) of 40° C.$\leq Tg_B \leq$70° C., and the epoxy group-containing vinyl resin (C) has a weight-average molecular weight ($C_{Mw}$) of 10,000$\leq C_{Mw} \leq$100,000 and has the epoxy equivalent ($C_{EP}$) of 1,000 g/Eq$\leq C_{EP} \leq$20,000 g/Eq.

3. A binder resin (A) for a toner obtained by the process of claim 1, wherein the content ($A_{IS}$ of a gel component is 1 mass %$\leq A_{IS} \leq$50 mass % and the content ($A_{VO}$) of a volatile component in the resin is $A_{VO} \leq$200 ppm.

4. A toner for electrophotography comprising the binder resin (A) for a toner as described in claim 3.

* * * * *

UNITED STATES PATENT AND TRADEMARK OFFICE
CERTIFICATE OF CORRECTION

PATENT NO. : 7,534,542 B2  
APPLICATION NO. : 10/572647  
DATED : May 19, 2009  
INVENTOR(S) : Takeshi Yoshida et al.

Page 1 of 1

It is certified that error appears in the above-identified patent and that said Letters Patent is hereby corrected as shown below:

Claim 1, Column 11, Line 25: change "acrylic acid methacrylic acid" to --acrylic acid, methacrylic acid,--.

Claim 2, Column 12, Line 22: change "$10,000 \leqq C$" to --$10,000 < C$--.

Claim 3, Column 12, Line 25: change "$(A_{IS}$" to --$(A_{IS}$--.

Signed and Sealed this

Eleventh Day of August, 2009

David J. Kappos
*Director of the United States Patent and Trademark Office*